A. T. STURT.
LEVER CONTROL FOR MOTOR VEHICLES.
APPLICATION FILED SEPT. 1, 1911.
1,025,216.
Patented May 7, 1912.
4 SHEETS—SHEET 3.
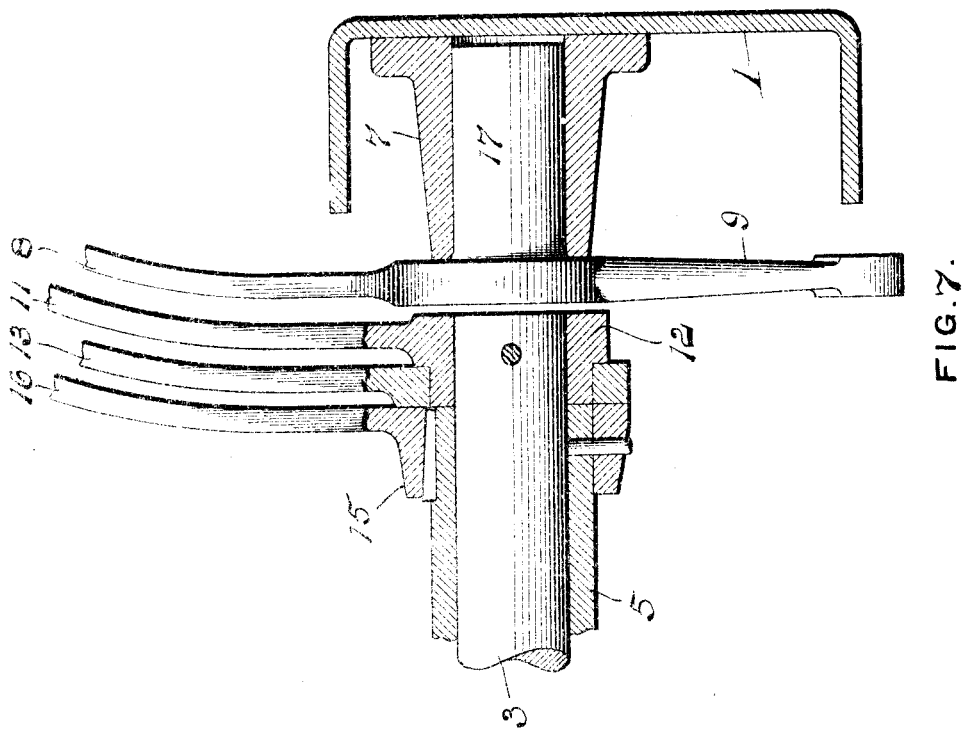
Witnesses
Chas W. Stauffiger
Anna C. Painter
Inventor
Alfred T. Sturt
By
Attorneys

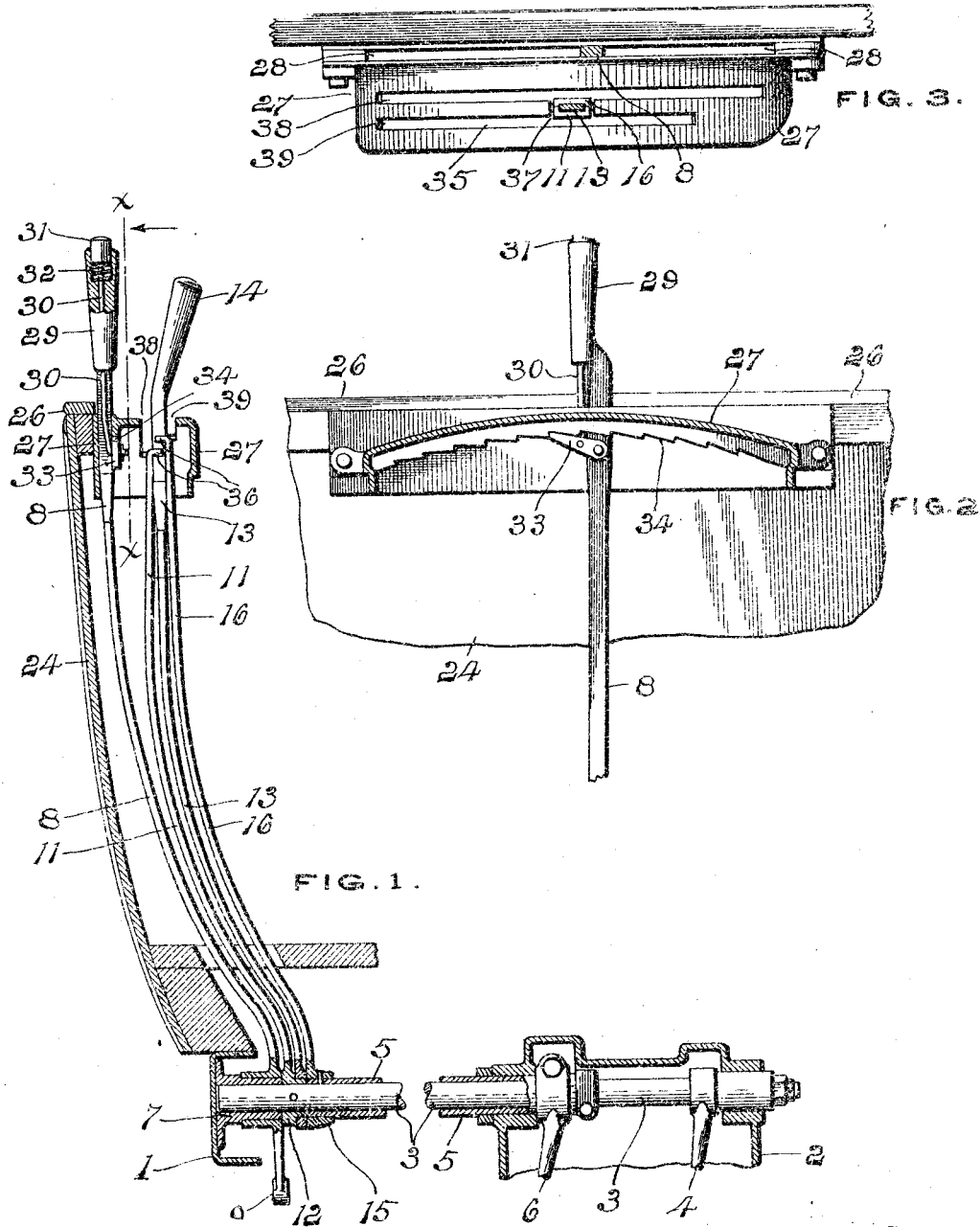

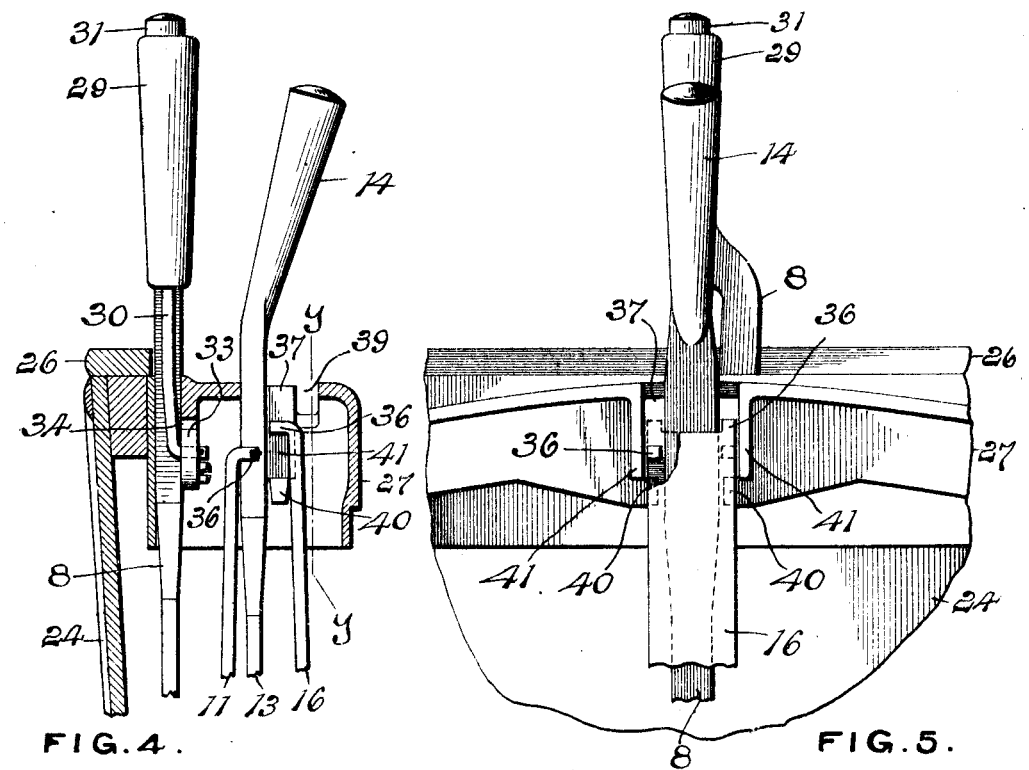

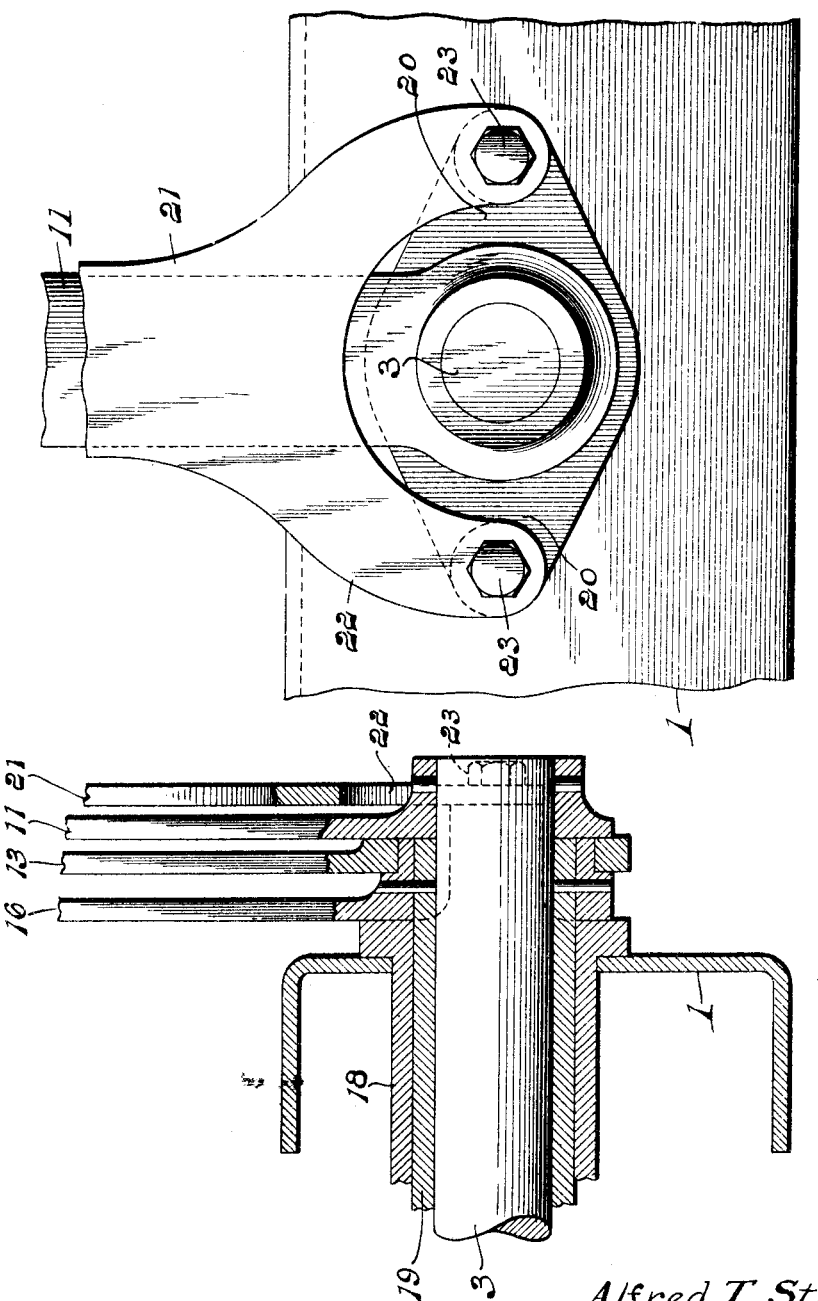

UNITED STATES PATENT OFFICE.

ALFRED T. STURT, OF FLINT, MICHIGAN, ASSIGNOR TO BUICK MOTOR CO., OF FLINT, MICHIGAN, A CORPORATION OF MICHIGAN.

LEVER CONTROL FOR MOTOR-VEHICLES.

1,025,216.      Specification of Letters Patent.      Patented May 7, 1912.

Application filed September 1, 1911. Serial No. 647,199.

*To all whom it may concern:*

Be it known that I, ALFRED T. STURT, a citizen of the United States of America, residing at Flint, in the county of Genesee and State of Michigan, have invented certain new and useful Improvements in Lever Controls for Motor-Vehicles, of which the following is a specification, reference being had therein to the accompanying drawings.

In modern automobile construction where what is known as "fore-door" bodies are used, the levers controlling the brake and transmission mechanisms are often brought up inside of the body through the floor, but owing to the width and shape of the body these levers as ordinarily constructed must of necessity be located at a considerable distance inward from the closed side or false door of the body and therefore take up much valuable space and are not convenient to operate.

The object of this invention is to provide a construction and arrangement of inside lever controlling mechanism especially adapted for "fore-door" bodies, and the invention consists in the matters hereinafter more fully described and particularly pointed out in the claims, reference being had to the accompanying drawings in which—

Figure 1 is a sectional detail of controlling mechanism embodying the invention, showing the same in operative position; Fig. 2 is a detail of the brake lever and sector showing the same in section on the line *x—x* of Fig. 1; Fig. 3 is a plan view of Fig. 2 with the levers in section; Fig. 4 is an enlarged sectional detail of the upper ends of the levers and adjacent parts; Fig. 5 is a section on the line *y—y* of Fig. 4; Fig. 6 is a detail showing in plan view a portion of a fore-door automobile body with a mechanism embodying the invention in place thereon and parts broken away to show the construction; Fig. 7 is an enlarged sectional detail of the lower ends of the operating levers and adjacent parts, showing a modified construction; Fig. 8 is a similar view showing a further modified construction; and Fig. 9 is a side elevation of Fig. 8.

In the construction of automobile bodies of the "fore-door" type, it is necessary in order to give the front seat the proper length and not to make the dash excessively wide, to curve the sides or fore-door of the body forwardly and inwardly from the seat to meet the dash and to also curve said sides outwardly and upwardly from the chassis frame or lower edge of the body to correspond with the width of the body opposite the front seat. In standard motor vehicle construction, the operating or control shafts of the variable speed transmission mechanism are necessarily positioned horizontally and at right angles to the longitudinal center line of the chassis and therefore the control levers carried thereby, as ordinarily constructed, swing in a path parallel to said center line and approach the fore-door or body side as they are turned forwardly, thus necessitating the shortening of the levers and the locating of the same at a considerable distance from said side. Much valuable space within the body is thus taken up by the levers and they are inconvenient to operate, being short and within the body below the upper edge of the body side.

In the construction and arrangement of parts shown in the accompanying drawings as illustrating a preferred embodiment of the invention, 1 is one of the side channel members of the chassis, which chassis may be of any preferred form and construction, and 2 is the casing of a variable speed transmission mechanism of any preferred type and construction, which casing is carried upon the chassis in the usual manner and is provided with bearings for an operating or control shaft 3 extending horizontally toward the channel member 1 at right angles thereto. Secured upon the shaft 3 within the casing 2 is an arm 4 for operating parts of a variable speed mechanism (not shown) and free to turn upon said shaft is a sleeve 5 extending into the casing through one of the bearings thereon and provided with an arm 6 secured to its inner end for operating other parts of the mechanism. The outer end of the shaft 3 is supported and turns freely within a bearing member 7 therefor, secured within the channel of the member 1 and this bearing stud or member is turned down at its inner end to afford a pivotal support for a lever 8 which turns freely thereon and is formed with a downwardly extending arm 9 to which a rod 10 (see Fig. 6) may be attached for operating the emergency or outer brakes (not shown) of an automobile. A lever 11 provided with a hub portion 12 at its lower end is pinned upon the shaft 3 to turn the same and the projecting end of said hub is turned down to afford a pivot-bearing for an operating or control hand lever 13 which turns freely thereon and is provided with a hand grip 14 at its upper end. The hub 12 of the lever 11 abuts the outer end of the sleeve 5 and the hub 15 on the lower end of a lever 16 is pinned or otherwise secured to said end of said sleeve to turn the same, said hand lever 13 being held in place upon the hub 12 by said hub 15 to turn freely between the levers 11 and 16.

In Fig. 7 a modified construction is shown in which the shaft 3 is stopped short of the bearing stud 7, said shaft being unsupported at its outer end, and the brake lever 8 is formed with a trunnion 17 to engage and turn freely within the bearing member 7. A further modified construction is shown in Figs. 8 and 9 in which the levers are all located outside of the channel member 1 and the shaft 3 and sleeve 5 are extended through an opening in said member. The brake mechanism is operated by means of a sleeve 18 extending through the opening in the channel bar and turning freely therein, and the sleeve 19 which corresponds to the sleeve 5 fits within said sleeve, extending therethrough and turning freely therein upon the shaft 3 which is extended beyond both sleeves and turns independently of them. Laterally extending arms 20 on the outer end of the sleeve 18 extend outwardly at each side of the hubs of the other levers and the brake lever 21 which corresponds to the lever 8 of the other constructions is provided with a forked lower end forming arms 22 which are secured by bolts 23 to the arms 20 on the sleeve. The lever 11 is secured to the outer end of the shaft and the lever 13 turns freely between said lever and the lever 16 which is secured to the sleeve 19 against the end of the sleeve 18. It is obvious that other arrangements may be provided to adapt the levers to operate the different constructions and types of transmissions. The false door or fixed side 24 of the automobile body which extends forwardly from one end of the front seat, is curved forwardly and inwardly to meet the end of the dash 25, as shown in plan view in Fig. 6, and is also curved upwardly and outwardly from the top of the member 1 upon which it rests, as shown in Fig. 1. The lever 8 is bent laterally to extend upwardly close to the inner face of the body and projects above the upper edge or rail 26 of said side which may be cut away slightly to receive a guide sector 27 through the guide slot 28 of which the said lever extends. In plan view, said sector is straight, and thus the longitudinal center line of its guide slot forms a chord of the curve extending at a slight angle to the longitudinal center line of the body. Said lever being pivoted at its lower end to turn upon an axis extending horizontally at right angles to the longitudinal center line of the body, when said lever is moved forwardly or rearwardly from mid position, it is caused to bend laterally intermediate its ends as its upper end is guided in said slot toward or from the longitudinal center-line of the body, and said lever is therefore so made as to adapt it to bend. A hand grip or handle 29 on the upper end of said brake lever is formed with an axial bore for a rod 30 extending therethrough and with a chamber in its upper end for a head 31 on the rod and for a coiled spring 32 interposed between the head and the bottom of the chamber. The lower end of the rod is pivotally attached to a pawl 33 carried by the lever and adapted to engage notches 34 formed in the lower edge of a flange on the sector. The sector 27 is also formed with an inwardly extending portion having an H shot 35 through which the hand lever 13 extends with its handle portion 14 above the rail 26 and adjacent to the handle 29. This lever 13 and also the levers 11 and 16 are bent to extend upward substantially parallel with the lever 8 and lie close to the side of the body, and like said lever 8 they are formed of spring metal and adapted to yield laterally to permit the hand lever to be moved from one end of the sector to the other and to be shifted laterally from one run to the other of the H slot. The levers 11 and 16 are preferably wider than the hand lever 13 and are formed at their upper ends with laterally extending lugs 36 to engage the edges of said hand lever adjacent to the sector. The portion 37 of the H-slot connecting the two longitudinal runs 38 and 39 thereof permits of the shifting of the hand lever therethrough from one to the other of said slots, but lugs 40 extending into said connecting portion prevent the levers 11 and 16 from passing therethrough. Downwardly extending flanges 41 at each side of the connecting slot prevent the movement of the said levers 11 and 16 longitudinally of the sector when said levers are in mid or neutral position with their upper ends within said connecting slot and when the shifting lever 13 is in neutral position, it lies within the connecting slot between the lugs 40 with the upper ends of the operating levers 11 and 16 engaging it and by their spring action tending to hold it in that position. When in neutral position, the shifting or hand lever may be moved laterally into the longitudinal portion 38 of the H-slot against the spring action of the operating lever 11 resting against it and may then be shifted forwardly or rearwardly in said slot to move said operating lever and operate the transmission mechanism. The moving of the hand lever laterally out of the connecting slot into the slot 38, springs the operating lever 11 out of the connecting slot and disengages the hand lever from the operating lever 16 which is thus left in the connecting slot where it is held in neutral position by its own spring action which yieldingly holds it in contact with the lugs 40, as illustrated in Fig. 4. When the hand lever is moved from neutral position into the slot 39, the operating lever 16 is likewise actuated and the lever 11 locked in neutral position. The spring action of the operating levers hold them engaged with the hand lever and each is caused to move with said hand lever by the engagement of the lugs 36 therewith when the same is shifted in the longitudinal slots.

By this arrangement a construction is secured which is especially adapted for fore-door bodies, the controlling levers lying close to the false door or side where they take up but little space within the body and follow substantially the curve of the side in their movement with their hand grips and sector adjacent to the rail or upper edge of said side where they are convenient to operate and are in plain view of the operator. The angular position of the sector with relation to the normal movement of the levers, causes said levers to engage the side of the slot in shifting, thus preventing play and rattling, and by making the levers themselves to serve as springs, the necessity for separate springs to hold the levers in position, is obviated.

Having thus fully described my invention what I claim is:

1. In a motor vehicle, the combination with a body having a side portion extending longitudinally of the body in a line the general direction of which is at an angle to the longitudinal center line of the body, of a controlling lever adjacent to said side portion of the body for actuating controlling mechanism and pivoted to turn upon a horizontal axis extending at right angles to the longitudinal center line of the body and adapted to yield laterally intermediate its ends to permit its upper end to follow substantially said line of said side portion of the body as said lever is turned upon its pivot.

2. In a motor vehicle, the combination of an automobile body of the fore-door type having a fixed side portion with the upper edge of said portion extending forwardly and inwardly at an angle to the longitudinal center line of the body, a controlling lever for actuating controlling mechanism, pivoted to turn upon an axis at right angles to the longitudinal center line of the body, and means mounted upon said side portion of the body adjacent to its upper edge to guide the upper end of said lever and cause the same to move in a path extending along said edge.

3. In a motor vehicle, the combination of an automobile body having an inwardly and forwardly curved side portion, a controlling lever pivoted at its lower end below the body upon a horizontal axis extending at right angles to the horizontal center line of the body, said lever extending upward adjacent to the inner face of the said portion of the body, and a sector secured to said portion of the body near the upper edge thereof having a guide slot for said lever extending at an angle to the longitudinal center line of the body, said lever being adapted to yield laterally intermediate its ends to permit the same to move in said slot.

4. In a motor vehicle, the combination of a vehicle body having a fixed side portion curved inwardly and forwardly and curved upwardly and outwardly from its lower edge, a lever for operating controlling mechanism pivotally supported below the plane of the body adjacent to the lower edge of said side portion, to turn upon an axis extending at right angles to the longitudinal center line of said body, said lever being bent laterally and extending upward adjacent to the inner face of said side portion and being resilient to yield laterally intermediate its ends, and a sector secured to said body portion near the upper edge thereof and having a guide slot for said lever the center line of which slot forms a chord of the curve of said portion, extending at an angle to the longitudinal center line of the body.

5. In a motor vehicle, the combination with a chassis, of a vehicle body having a seat, a dash and a fixed side curving forwardly and inwardly from the end of the seat to the dash and supported upon the chassis, a plurality of levers pivotally supported at their lower ends to turn upon a horizontal axis extending at right angles to the longitudinal center line of the body and curved outwardly and extended upwardly adjacent to the inner face of the said curved body side, said levers being resilient to permit of their being flexed laterally, a handle portion upon one of said levers projecting above the upper edge of the body side, said lever being adapted to engage and turn the other levers, and a sector secured to the body side and having an H-slot through which the lever having the handle projects.

6. In a motor vehicle, the combination with a chassis and a vehicle body mounted upon said chassis, of controlling mechanism upon the chassis comprising a horizontal shaft and a sleeve upon the shaft extending at right angles to the longitudinal center line of the chassis, an operating lever secured to the shaft, an operating lever secured to the sleeve, a hand lever between the operating levers to turn freely upon an axis coincident with the axis of the shaft, all of said levers being bent laterally and extended upwardly within the body adjacent to the side thereof and being resilient to flex laterally, and said operating levers being formed at their upper ends to detachably engage the hand lever and be moved thereby, a sector having a slot for the hand lever, and means on the sector for engaging and holding each operating lever in neutral position while the other operating lever is actuated by the hand levers.

7. In a motor vehicle, the combination with a chassis and a vehicle body upon said chassis, of a brake lever for operating brake mechanism, pivotally supported upon the chassis to turn upon a horizontal axis extending at right angles to the longitudinal center line of the chassis, said lever being resilient and extending upward within the body adjacent to a side thereof, resilient operating levers for actuating controlling mechanism, pivoted at their lower ends to turn upon an axis extending at right angles to the horizontal center line of the chassis, a resilient hand lever pivoted to turn upon an axis coincident with the axis of the other levers and adapted to be engaged by said operating levers at their upper ends to turn the same, a sector having slots for the brake and hand levers, said sector being positioned with said slots extending at an angle to the longitudinal center line of the body, and means for holding the levers in the position to which they are turned.

8. In a motor vehicle, the combination with a chassis, of a casing for variable speed transmission mechanism supported upon said chassis, an operating shaft having bearings in said casing and extending horizontally at right angles to the longitudinal center line of the chassis, an operating sleeve on said shaft, a vehicle body upon the chassis having a fixed side curved inwardly and forwardly and curved upwardly and outwardly from said chassis, an operating lever secured to the sleeve, an operating lever secured to the shaft, a hand lever free to turn between said levers, all of said levers being bent and extended upward adjacent to the inner face of said side of the body and said levers being resilient to spring laterally, a sector secured to said body side near its upper edge and formed with an H-slot extending in a longitudinal direction at an angle to the longitudinal center line of the body, said slot being adapted to receive the upper end of the hand lever to guide the same, lugs on the upper ends of the operating levers to engage the edges of the hand lever adjacent to the sector, and lugs on the sector to engage the operating levers and hold one of the same out of engagement with the hand lever during the operation of the other by said hand lever.

In testimony whereof I affix my signature in presence of two witnesses.

ALFRED T. STURT.

Witnesses:
H. J. MALLERY,
K. A. GORDON.